United States Patent
Trybuła et al.

(10) Patent No.: US 10,941,814 B2
(45) Date of Patent: Mar. 9, 2021

(54) COUPLING ASSEMBLY (71) Applicant: Hamilton Sundstrand Corporation, Charlotte, NC (US)

(72) Inventors: Daniel Trybuła, Wroclaw (PL); Maciej Sobieszek, Wroclaw (PL)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 381 days.

(21) Appl. No.: 15/974,774

(22) Filed: May 9, 2018

(65) Prior Publication Data
US 2019/0024722 A1 Jan. 24, 2019

(30) Foreign Application Priority Data
Jul. 18, 2017 (EP) ..................................... 17461568

(51) Int. Cl.
*F16D 3/223* (2011.01)
*F16D 3/221* (2006.01)
*F16C 33/36* (2006.01)

(52) U.S. Cl.
CPC ............. *F16D 3/223* (2013.01); *F16D 3/221* (2013.01); *F16C 33/36* (2013.01); *Y10T 29/49826* (2015.01)

(58) Field of Classification Search
CPC .......... F16D 3/223; F16D 3/221; F16D 3/185; F16D 3/202; Y10T 29/49826; F16C 33/36
(Continued)

(56) References Cited

U.S. PATENT DOCUMENTS 2,140,295 A * 12/1938 Mallard ................. F16D 3/224
464/152
2,375,030 A 5/1945 O'Malley
(Continued)

FOREIGN PATENT DOCUMENTS

DE 3007319 A1 9/1981
DE 19749797 A1 5/1999
(Continued)

OTHER PUBLICATIONS

Extended European Search Report for International Application No. 17461568.2 dated Feb. 6, 2018, 6 pages.
(Continued)

*Primary Examiner* — Greg Binda
(74) *Attorney, Agent, or Firm* — Cantor Colburn LLP (57) ABSTRACT

A coupling assembly for rotatably coupling two shafts comprises a first shaft extending longitudinally between a first end and a second end and having a radially extending flange at said second end; a second shaft extending longitudinally between a first end and a second end and having a radially extending hollow receiving member at said first end, the flange being positioned within the hollow receiving member, The hollow receiving member comprises an inner cylindrical surface comprising at least one longitudinally extending member groove and the flange comprises an outer cylindrical surface comprising at least one longitudinally extending flange groove. The coupling assembly also includes a barrel-shaped roller bearing provided to extend longitudinally within and in contact with both said flange groove and said receiving member groove and the flange groove and/or said member groove has a longitudinal concave barrel shape for receiving and contacting said barrel shaped roller bearing.

13 Claims, 5 Drawing Sheets (58) Field of Classification Search
USPC .......................................... 464/152; 29/428
See application file for complete search history.

(56) References Cited

U.S. PATENT DOCUMENTS

| | | | |
|---|---|---|---|
| 3,365,914 A | | 1/1968 | Asher |
| 3,789,624 A | * | 2/1974 | Camosso .............. F16D 3/2245 |
| 4,432,741 A | | 2/1984 | Winkler |
| 4,464,141 A | | 8/1984 | Brown |
| 5,795,231 A | | 8/1998 | Fukuda |
| 7,115,038 B2 | * | 10/2006 | Agner .................. F16D 1/0876 |
| 2016/0214707 A1 | | 7/2016 | Didey et al. |

FOREIGN PATENT DOCUMENTS

| | | | |
|---|---|---|---|
| JP | 55-69322 A | * | 5/1980 |
| JP | S55069322 A | | 5/1980 |

OTHER PUBLICATIONS

European Communication pursuant to Article 94(3) (EPC) for Application No. 17461568.2 dated Sep. 20, 2019, 5 pages.

* cited by examiner

COUPLING ASSEMBLY

FOREIGN PRIORITY

This application claims priority to European Patent Application No. 17461568.2 filed Jul. 18, 2017, the entire contents of which is incorporated herein by reference.

TECHNICAL FIELD OF INVENTION

The present disclosure relates to coupling assemblies for rotating shafts. In particular, the disclosure relates to coupling assemblies for torque transmission systems.

BACKGROUND

In many mechanical situations, it is desirable to connect two coaxial shafts such that torque is transmitted from one shaft to the other via rotation while also being able to accommodate axial misalignment between the two shafts.

U.S. Pat. No. 4,464,141 describes a shaft coupling system for accommodating axial displacement and angular misalignment between two shafts. These couplings may be used to allow the transmission of power between a drive shaft and a driven shaft. In this system, a spline adapter, connected to a first shaft, cooperates with a bushing, connected to a second shaft, that has spline teeth extending from its outer surface. The spline teeth are substantially boat-shaped. The shape of the teeth allows for extra clearance at the ends of the coupling system, which is necessary to accommodate angular misalignment between the shafts. However, the boat shape of the teeth can be difficult to manufacture.

Another known flexible coupling is described in U.S. Pat. No. 2,375,030. In this universal coupling a first shaft has a head at one end, the head having a part cylindrical surface. The head fits within the interior of a sleeve that is rigidly connected to a second shaft. The radially outer surface of the head has a plurality of longitudinally extending semi-cylindrical grooves spaced around its circumference. The grooves are oriented in a direction parallel to the shaft axis of the first shaft. The sleeve also has a plurality of longitudinally extending semi-cylindrical grooves on its inner surface which are complementary to the grooves of the head.

A roller is inserted into each cylindrical aperture defined by the complementary semi-cylindrical grooves, to serve as a torque transmitting key between the flange and the hollow cylindrical member without interfering with a rocking motion between head and sleeve during misalignment of the shafts. When torque is applied to the first shaft, the torque is transmitted from the shaft to the flange, from the flange to the roller, from the roller to the hollow cylindrical member, and from the hollow cylindrical member to the second shaft.

It is desirable to improve such flexible couplings, for example, by reducing the manufacturing time and/or costs, improving the torque transfer between the shaft (i.e. reducing frictional losses in the flexible coupling), and/or reducing backlash between the two shafts and the present disclosure addresses these issues.

SUMMARY OF INVENTION

According to a first aspect, the disclosure provides a new type of coupling assembly for rotatably coupling two shafts, the coupling assembly comprising: a first shaft extending longitudinally between a first end and a second end and having a radially extending flange at said second end; a second shaft extending longitudinally between a first end and a second end and having a radially extending hollow receiving member at said first end, the flange being positioned within the hollow receiving member; and wherein said hollow receiving member comprises an inner cylindrical surface comprising at least one longitudinally extending member groove; and wherein said flange comprises an outer cylindrical surface comprising at least one longitudinally extending flange groove; said coupling assembly further comprising a barrel-shaped roller bearing provided to extend longitudinally within and in contact with both said flange groove and said receiving member groove and further wherein said flange groove and/or said member groove has a longitudinal concave barrel shape for receiving and contacting said barrel shaped roller bearing.

A method of rotatably coupling two shafts is also described herein, the method comprising the steps of providing a first shaft extending longitudinally between a first end and a second end and having a radially extending flange at said second end; and forming a longitudinally-extending flange groove in said radially extending flange; providing a second shaft extending longitudinally between a first end and a second end and having a radially extending hollow receiving member at said first end; and forming a longitudinally-extending member groove in an inner circumferential surface of said hollow cylindrical member; positioning said flange within said hollow receiving member; and further providing a barrel-shaped roller bearing that extends longitudinally within, and is in contact with, both said flange groove and said receiving member groove and further wherein said flange groove and/or said member groove has a longitudinal concave barrel shape for receiving and contacting said barrel shaped roller bearing.

The method may further comprise the step of securing the flange within the hollow cylindrical member such that the first shaft extends out of the hollow cylindrical member through a hole in a first surface of the hollow cylindrical member.

In any of the examples of the coupling assembly and method described herein, the roller bearing may have an axis of circular symmetry defining a longitudinal direction, and the barrel-shaped roller bearing may have a larger radius at a mid-point of the barrel along the longitudinal direction compared to a radius at either end of the barrel-shaped roller bearing.

In any of the examples of the coupling assembly and method described herein, the flange groove and the member groove may each have a concave surface in the circumferential direction.

In any of the examples of the coupling assembly and method described herein, the radius of curvature of the concave surface in the circumferential direction may be equal to or larger than the largest radius of the barrel-shaped roller bearing.

In any of the examples of the coupling assembly and method described herein, the concave surface, or each concave surface has a radius of curvature in the longitudinal direction that is less than infinity and is equal to or greater than a longitudinal radius of curvature of the roller bearing.

In other words, wherein a radius of curvature equals infinity, the surface is flat.

In any of the examples of the coupling assembly and method described herein the radius of curvature in the longitudinal direction may be between 8 times and 10 times larger than the longitudinal radius of curvature of the roller bearing. Having a larger radius of curvature prevents edge chopping.

Having a curved groove in the longitudinal direction improves the torque transfer between the two shafts.

Roller bearings made with this shape are commercially available with high hardness, very smooth surfaces (surface roughness, Ra, less than 0.16 μm), and low cost.

Having the roller bearing fit in circumferential curved grooves improves the torque transfer and reduces pressure points that would result from, e.g. flat (radially extending) sides of the grooves. This results in better torque transfer. In the preferred range, this feature prevents edge chipping by giving a small amount of clearance at the edges.

DESCRIPTION OF THE FIGURES

Certain embodiments of the present disclosure will now be described in greater detail by way of example only and with reference to the accompanying figures in which.

DETAILED DESCRIPTION

Figures 1, 2A:
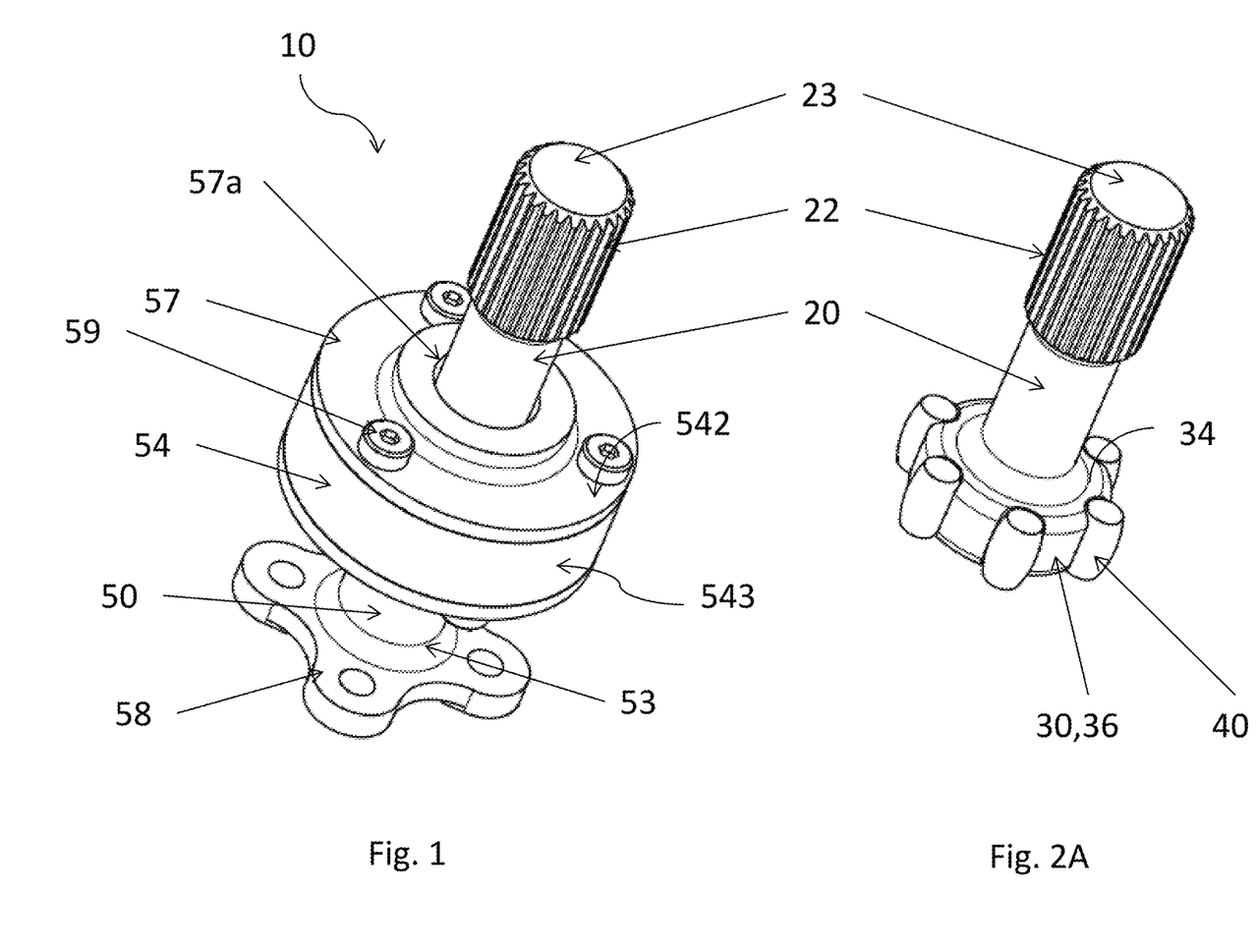
FIG. 1 shows a perspective view of a new type of coupling assembly.
FIG. 2A shows a perspective view of a first shaft of the coupling assembly with a plurality of rollers.

FIG. 1 shows an example of an improved rotatable shaft coupling 10 comprising a first shaft 20 and a second shaft 50.

Figure 2B:
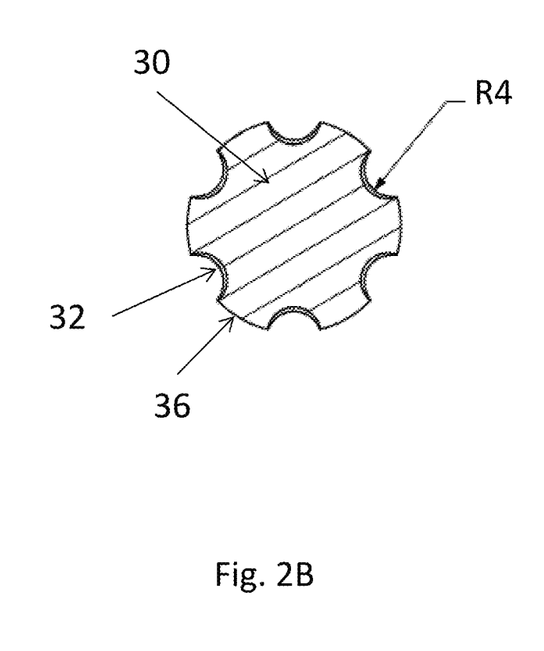
FIG. 2B shows a cross-sectional view across the flange without the rollers.
Figures 4A, 4B:
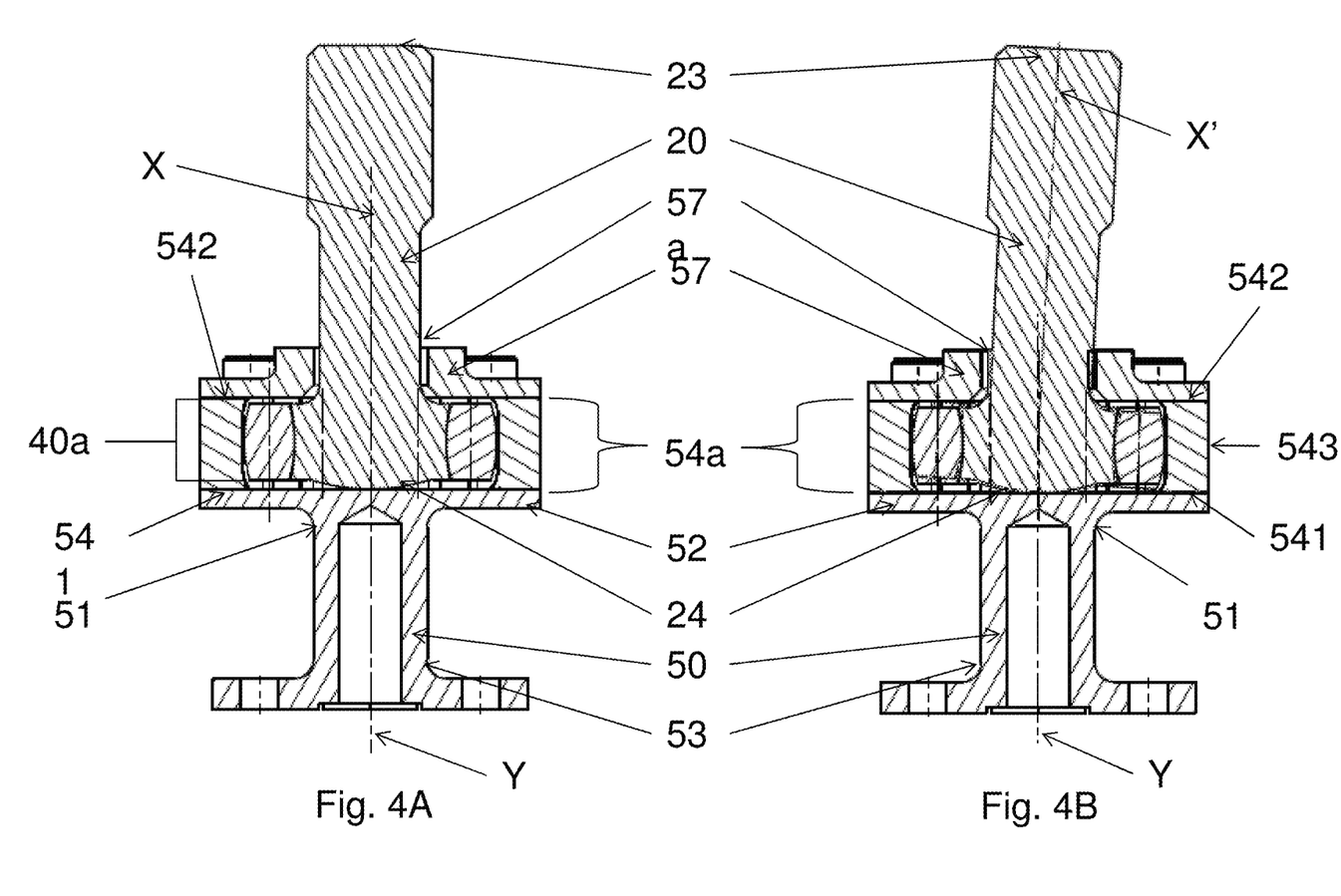
FIG. 4A shows a vertical cross-section taken along the longitudinal axis of the first shaft and showing the improved coupling assembly when both shafts are in a neutral position.
FIG. 4B shows a vertical cross-section taken along the longitudinal axis of the first shaft and showing the coupling assembly where the shafts are not in a neutral position and the two shafts are not aligned.

As shown in FIGS. 1 and 2A-C, the first shaft 20 extends longitudinally between a first end 23 and a second end 24 and defines a first longitudinal shaft axis X. The second end 24 of the first shaft 20 has a radially extending flange 30 which has a greater diameter than the first shaft 20 and which extends circumferentially around the second end 24 of the first shaft 20. In some examples the flange 30 may be described as being generally circular with a first side 34 and an opposite second side 35 with an outer circumferential surface 36 extending there between. The flange 30 further has a plurality of longitudinally extending grooves 32 formed around its outer circumferential surface 36. Each groove provides a concave surface in the circumferential direction. In some embodiments, the grooves 32 may be semi-cylindrical, although other shapes are envisaged, such as grooves that depart from a semi-cylindrical profile along their length and/or across their width. As can be seen in FIGS. 2B, 4A and 4B, the flange grooves 32 extend longitudinally between the first side 34 and the opposing second side 35 of the flange 30 (i.e. parallel to the axis X of the first shaft 20). As is described later, each of the flange grooves 32 provides a seat for a barrel-shaped roller bearing 40, as shown in FIG. 2A.

Figure 2C:
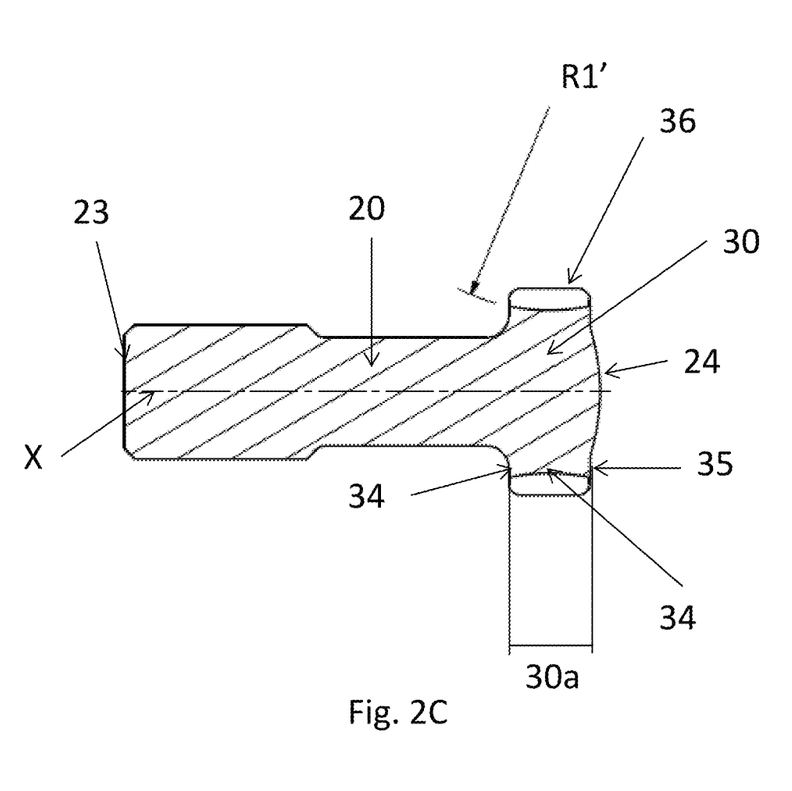
FIG. 2C shows a cross-sectional view of the first shaft without the rollers, taken along the longitudinal axis of the first shaft.

The regions on the outer circumferential surface 36 of the flange 30, between the grooves 32, may be curved convexly, with a respective radius of curvature, in both the circumferential and longitudinal directions. The radius of curvature in the longitudinal direction will usually be larger than the radius of curvature in the circumferential direction.

As shown in FIG. 4A, the second shaft 50 extends between a first end 51 and a second end 53 and defines a second longitudinal shaft axis Y. A hollow cylindrical member 54 is provided at the first end 51 of the second shaft 50. The cylindrical member 54 has an outer cylindrical surface 543 that is rigidly connected to the first end 51 of the second shaft 50. In some examples, such as that shown in FIG. 4A, this cylindrical member 54 may be fixedly connected to the first end 51 of the second shaft 50 via screws 59 or by other suitable attachment means. Alternatively, the hollow cylindrical member 54 may be formed integrally with the first end of the second shaft 50.

In some examples, the second shaft 50 may also have a radially extending flange 58 at its second end 52, i.e. at the end opposite end from a hollow cylindrical member 54, for connecting the second shaft 50 to another item. Alternative connectors, such as splines, may be used instead of the flange 58 on the second shaft 50.

The hollow cylindrical member 54 has a first side 541 and an opposing second side 542 with the cylindrical outer surface 543 extending therebetween. As is shown in FIG. 4A, the first side 541 is connected to the first end 51 of the second shaft 50 so that the second side 542 is farther away from the second shaft 50. A hole 57a is provided through the center of the second side 542 of the hollow cylindrical member 54, as is shown in FIGS. 1, 4A and 4B. This hole 57a is sized and shaped so that the first shaft 20 can extend through the hole 57a as shown in the figures when two shafts are coupled together, as described below.

In some examples, the second side 542 of the hollow cylindrical member 54 may comprise a plate 57 having the hole 57a therethrough and the plate may be connected to the hollow cylindrical member 54 via screws 59. Alternatively, the plate 57 could be in the form of a cup (not shown) having an internal screw thread around the rim that mates with a screw thread on the external surface 543 of the hollow cylindrical member 54. The plate 57 could then be screwed onto the hollow cylindrical member 54. Other methods or means of forming this hollow cylindrical member 54 may also be used.

The hollow cylindrical member 54 therefore defines an enclosure suitable for containing the radially extending flange 30 of the first shaft 20 therein. The first shaft 20 may then extend through the hole 57a and connect to another member via splines 22. Alternative connectors are also envisaged instead of the splines 22.

Figure 3A:
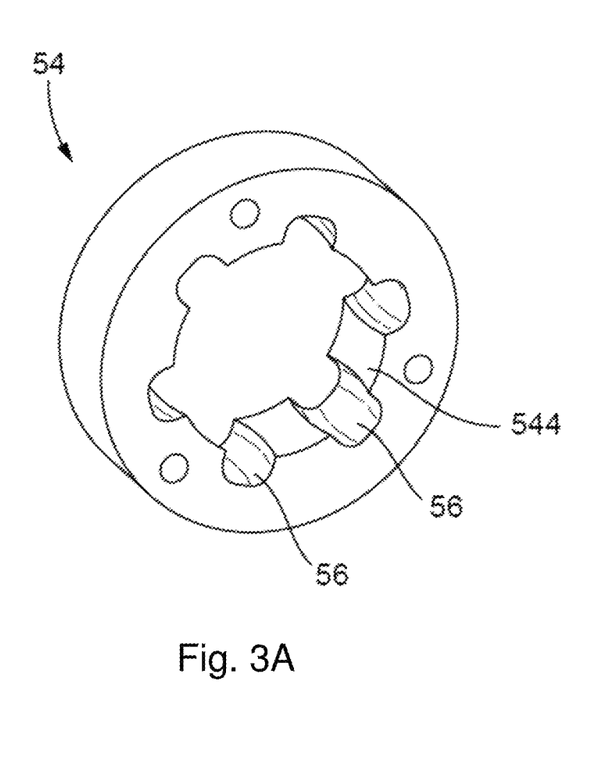
FIG. 3A shows a perspective view of the hollow cylindrical member.
Figure 3B:
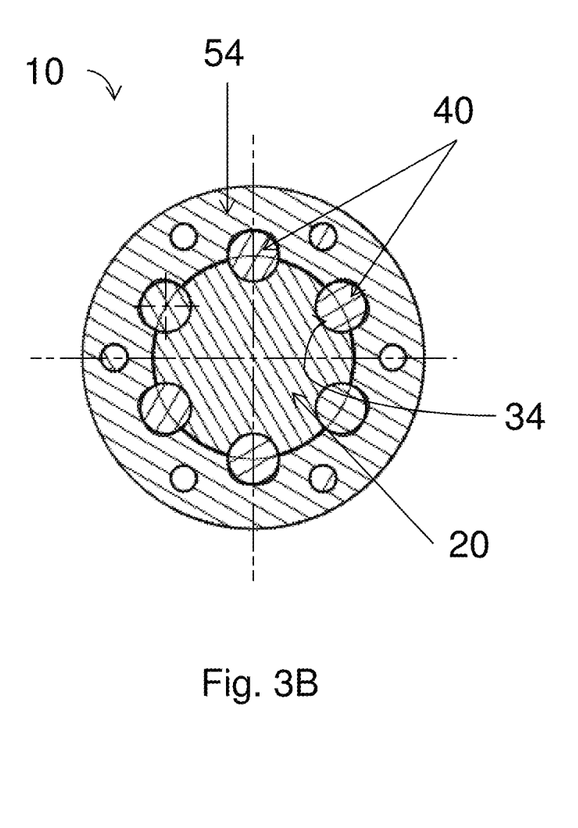
FIG. 3B shows a horizontal cross-section of the improved coupling assembly taken along the axis A of FIGS. 1 and 4A, which is perpendicular to the longitudinal axis of the first shaft, and depicting the hollow cylindrical member, rollers, and the flange.

As shown in FIG. 3A, the hollow cylindrical member 54 may also comprise a plurality of longitudinally extending (i.e. parallel to the longitudinal axis of the second shaft 50) grooves 56 on its inner surface 544. As with the grooves 32 on the flange 30, the grooves 56 on the hollow cylindrical member 54 may be semi-cylindrical grooves, but other shapes are envisaged. As shown in FIG. 3B, these grooves 56 are complementary in number and position to the grooves of the flange 30. Therefore, when the flange 30 is positioned within the cylindrical member 54, the grooves of both the flange 30 and the hollow member 54 align with each other to produce longitudinally extending generally cylindrical grooves.

Figure 5:
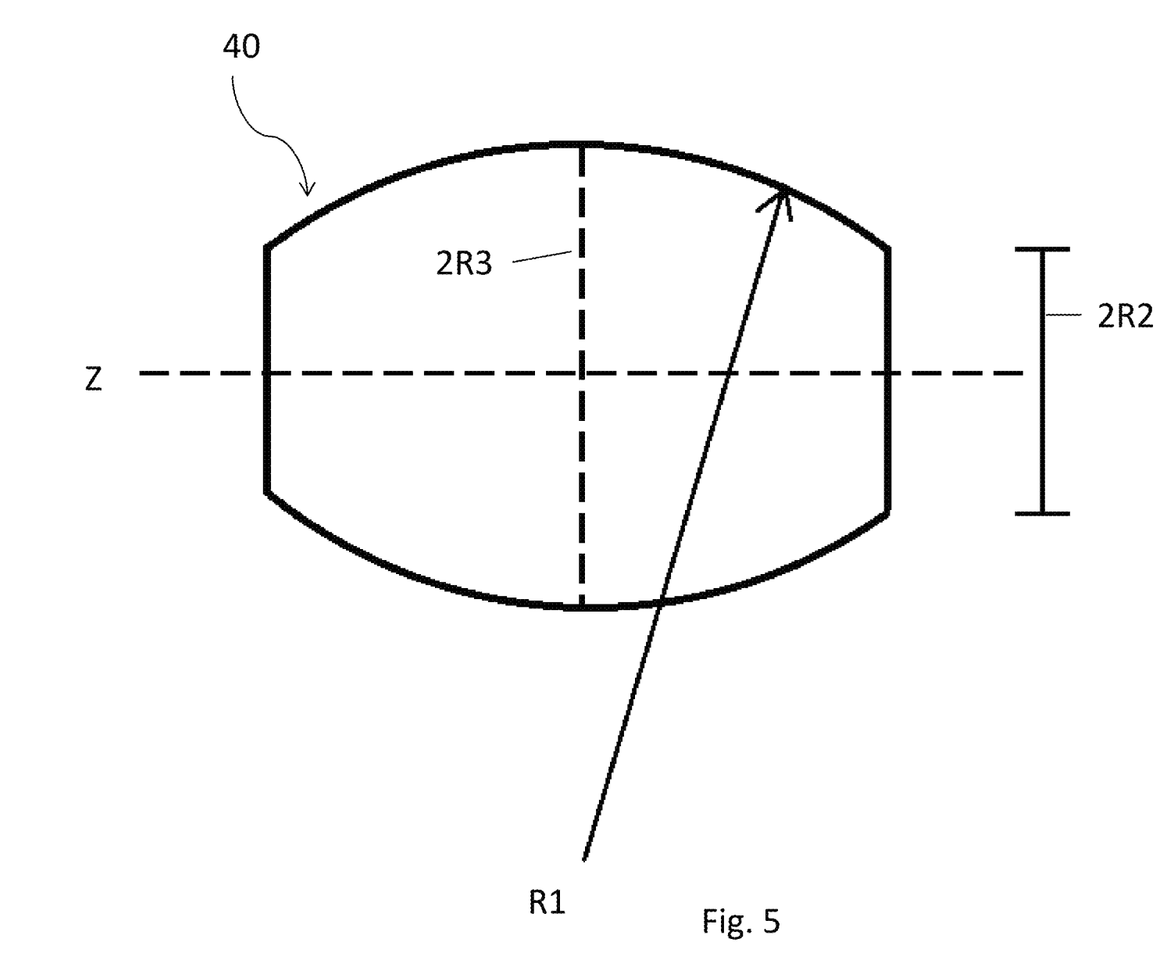
FIG. 5 shows a longitudinal cross-section of a roller bearing for the flexible coupling assembly (not to scale).

Barrel shaped roller bearings 40 are then positioned to extend longitudinally within and in contact with these grooves as shown in FIGS. 2 to 4B. The flange groove and/or member groove have a longitudinal concave barrel shape for receiving and contacting said barrel shaped roller bearing. As further shown in FIG. 5, the barrel-shaped roller bearing 40 has one axis Z of cylindrical symmetry, i.e. the axis about which the roller bearing may freely roll, which defines the longitudinal direction/axis of the roller bearing 40. The roller bearing 40 is barrel shaped, that is, it has a generally cylindrical shape around the longitudinal axis in which a middle part of the cylinder (along the longitudinal direction) has a larger radius R3 than the radius R2 at both ends of the roller bearing 40. The radius varies gradually between R2 and R3, such that the roller bearing 40 also has a curved outer surface in the longitudinal direction (i.e. along axis Z). The curved surface in the longitudinal direction may a have a constant radius of curvature R1, i.e. form a section of a circle, as shown in FIG. 5. As explained in more detail below, the contact of the roller bearings 40 with both of the first shaft 20 and the second shaft 50 allows torque to be transmitted from the first shaft 20, via the flange 30, via the roller bearing 40, via the cylindrical hollow member 54, and into the second shaft 50. The radius of curvature in the longitudinal direction may be between 8 times and 10 times larger than the longitudinal radius of curvature of the roller bearing.

As shown in FIG. 3 and described above, in use, the flange 30 is positioned inside the hollow cylindrical member 54. The plurality of grooves 56 that extend generally longitudinally (i.e. parallel to the axis Y of the second shaft 50) in the hollow cylindrical member 54 enable each roller bearing 40 to be positioned in the grooves 32, 56 of both the flange 30 and the hollow cylindrical member 54. The roller bearings 40 may be oriented such that the longitudinal axis Z of each roller bearing 40 (i.e. its axis of cylindrical symmetry) is generally parallel to the axis X of the first shaft 20.

In some embodiments, the grooves 56 in the hollow cylindrical member 54 have a semi-cylindrical shape in the longitudinal direction. That is, the shape of these grooves 56 may be defined by the intersection of a cylinder with the inner surface of the hollow cylindrical member 54. This means that the sides of each groove 56 extending in the longitudinal direction (i.e. parallel to the second shaft axis Y) are flat, as depicted in FIGS. 4A and 4B. Optionally, the radius of curvature of the groove 56 of the hollow cylindrical member 54, in the circumferential direction, is greater than or equal to the largest radius of curvature R3 of the barrel-shaped roller bearing 40 (i.e. the radius of curvature at the mid-point of the roller bearing 40).

In the longitudinal direction, the grooves 32 in the flange 30 are not flat but are curved, as shown in the cross-section of FIG. 2C. The radius of curvature R1' in the longitudinal direction of the groove 32 may be equal to than the radius of curvature R1 of the roller bearing in the longitudinal direction such that there is contact between the groove 32 and the roller bearing 40 along a substantial portion of the length of the roller bearing 40.

Alternatively, the curve of the flange groove 32 may have a larger radius of curvature R1' in the longitudinal direction than the (longitudinal) radius of curvature R1 of the roller bearing 40. For example, the longitudinal radius of curvature R1 of the groove 32 may be up to 100% larger than the longitudinal radius of curvature R1 of the roller bearing 40.

As shown in FIG. 2B, the grooves 32 of the flange 30 are also curved in the circumferential direction of the flange 30. The radius of curvature R4 in the circumferential direction may be constant along the length of the groove 32. Optionally, the radius of curvature R4 of the flange groove 32 in the circumferential direction is greater than or equal to the largest radius of curvature R3 of the barrel-shaped roller bearing 40 (i.e. the radius of curvature at the mid-point of the roller bearing 40).

The flange 30 has a longitudinal width 30a (i.e. the width between first 34 and second 35 sides of the flange 30) that is smaller than the longitudinal internal width 54a of the hollow cylindrical member 54 in which is it positioned. Optionally, the roller bearings 40 have a length 40a that is substantially the same as or equal to the width 30a of the flange 30. Thus, in the neutral position, there is a clearance between the axial sides 34, 35 of the flange in the longitudinal direction, and the sides of the enclosure around the flange 30. This clearance allows the flange 30 limited movement inside the enclosure, such as may result from axial misalignment between the first 20 and second shafts 50.

When torque is applied to the first shaft 20 about the first shaft axis X, the flange 30 transfers the torque to the roller bearings 40 sitting within their respective flange grooves 32. The roller bearings 40, in turn, bear against the grooves 56 of the hollow cylindrical member 54 and thus transmit torque thereinto. As described above, the hollow cylindrical member 54 is fixedly attached to (or formed integrally with) the second shaft 50 and thus the torque is transmitted into the second shaft 50 causing it to rotate about the second shaft axis Y. Of course, the same process works in reverse, in that torque applied to the second shaft 50 about the second shaft axis Y is transmitted into the hollow cylindrical member, into the roller bearings 40, into the flange 30, and into the first shaft 20.

FIG. 4A shows a cross-section of the flexible coupling 10 in a neutral position wherein the first shaft axis X is coaxial with the second shaft axis Y. This figure shows the cross-section of the grooves 56 in the hollow cylindrical member and the cross-section of the flange grooves 32 in the flange 30.

FIG. 4B shows the flexible coupling 10 away from the neutral position that is depicted in FIG. 4A. In FIG. 4B, the axis X' of the first shaft 20 is not coaxial with the axis Y of the second shaft 50. The first rod 20 has pivoted about its curved second end 24 that abuts the end 52 of the second shaft 50. In the position shown, one of the roller bearings 40 has come into contact with the end 52 of the second shaft 50, and a diametrically opposite roller bearing 40 has come into contact with the plate 57. At the same position, a side of the first shaft 20 is in abutment with a side of the hole 57a in the plate 57. Thus, the hole 57a in the plate 57, the end 52 of the second shaft 50, and the plate 57 together define a hard stop that prevents further axial misalignment of the first 20 and second shafts 50. Optionally, if the rollers 40 are made shorter and the flange has a smaller thickness 30a, then the hard stop may be provided solely by the abutment of the side of first shaft 20 against the hole 57a of the plate 57.

As shown in FIG. 4B, the curved outer surface in the longitudinal direction of the roller bearings 40 allows the roller bearings 40 to rock within the grooves 56 in the hollow cylindrical member 54 so that the axis Z of each roller bearing 40 is no longer parallel to the axis of the second shaft 50. Instead, the axis of each roller bearing Z is remains parallel to the first shaft axis X.

In an alternative example, not shown, the grooves 32 of the flange 30 may be flat in the longitudinal direction and the grooves 56 of the hollow cylindrical member 54 may be curved in the longitudinal direction in the manner described above for the flange grooves 32. This arrangement may provide the same advantages as having the longitudinally curved grooves on the flange, as described above.

In another alternative example, not shown, the grooves 32 of the flange and the grooves 56 of the hollow cylindrical member 54 may both be curved in the longitudinal direction in the manner described above for the flange grooves 32. This exemplary flexible coupling 10 requires that the hollow cylindrical member 54 be made from at least from two separate pieces, so that the rollers 40 may be inserted into the grooves 32, 56 between the flange 30 and hollow cylindrical member 54.

The invention claimed is:

1. A coupling assembly for rotatably coupling two shafts, the coupling assembly comprising:
   a first shaft extending longitudinally between a first end and a second end and having a radially extending flange at said second end;
   a second shaft extending longitudinally between a first end and a second end and having a radially extending hollow receiving member at said first end,
   the flange being positioned within the hollow receiving member; and
   wherein said hollow receiving member comprises an inner cylindrical surface comprising at least one longitudinally extending member groove; and
   wherein said flange comprises an outer cylindrical surface comprising at least one longitudinally extending flange groove;
   said coupling assembly further comprising a barrel-shaped roller bearing provided to extend longitudinally within and in contact with both said flange groove and said receiving member groove and further wherein said flange groove and/or said member groove has a longitudinal concave barrel shape for receiving and contacting said barrel shaped roller bearing.

2. The coupling assembly according to claim 1, wherein the roller bearing has an axis of circular symmetry defining a longitudinal direction, and
   wherein the barrel-shaped roller bearing has a larger radius at a mid-point of the barrel along the longitudinal direction compared to a radius at either end of the barrel-shaped roller bearing.

3. The coupling assembly according to claim 1, wherein the flange groove and the member groove each have a concave surface in the circumferential direction.

4. The coupling assembly according to claim 3 wherein the radius of curvature of the concave surface of each of the flange groove and member groove in the circumferential direction is equal to or larger than the largest radius of the barrel-shaped roller bearing.

5. The coupling assembly according to claim 3, wherein the concave surface of each of the flange groove and member groove has a radius of curvature in the longitudinal direction that is less than infinity and is equal to or greater than a longitudinal radius of curvature of the roller bearing.

6. The coupling assembly of claim 5, wherein the radius of curvature in the longitudinal direction is between 8 times and 10 times larger than the longitudinal radius of curvature of the roller bearing.

7. A method of rotatably coupling two shafts, the method comprising the steps of:
   providing a first shaft extending longitudinally between a first end and a second end and having a radially extending flange at said second end; and forming a longitudinally-extending flange groove in said radially extending flange;
   providing a second shaft extending longitudinally between a first end and a second end and having a radially extending hollow receiving member at said first end; and forming a longitudinally-extending member groove in an inner circumferential surface of said hollow cylindrical member;
   positioning said flange within said hollow receiving member; and further providing a barrel-shaped roller bearing that extends longitudinally within, and is in contact with, both said flange groove and said receiving member groove and
   further wherein said flange groove and/or said member groove has a longitudinal concave barrel shape for receiving and contacting said barrel shaped roller bearing.

8. The method of claim 7 further comprising:
   securing the flange within the hollow cylindrical member such that the first shaft extends out of the hollow cylindrical member through a hole in a first surface of the hollow cylindrical member.

9. The method according to claim 7, wherein the roller bearing has an axis of circular symmetry defining a longitudinal direction, and
   wherein the barrel-shaped roller bearing has a larger radius at a mid-point of the barrel along the longitudinal direction compared to a radius at either end of the barrel-shaped roller bearing.

10. The method according to claim 7, wherein the flange groove and the member groove each have a concave surface in the circumferential direction.

11. The method according to claim 10, wherein the radius of curvature of the concave surface of each of the flange groove and member groove in the circumferential direction is equal to or larger than the largest radius of the barrel-shaped roller bearing.

12. The method according to claim 10, wherein the concave surface of each of the flange groove and member groove has a radius of curvature in the longitudinal direction that is less than infinity and is equal to or greater than a longitudinal radius of curvature of the roller bearing.

13. The method of claim 12, wherein the radius of curvature of each of the flange groove and member groove in the longitudinal direction is between 8 times and 10 times larger than the longitudinal radius of curvature of the roller bearing.

* * * * *